Oct. 4, 1966  H. STATZ ETAL  3,277,396
MEANS FOR MODULATING A LASER
Filed April 23, 1962  2 Sheets-Sheet 1

INVENTORS
HERMANN STATZ
ROY A. PAANANEN
BY
AGENT

United States Patent Office 3,277,396
Patented Oct. 4, 1966

3,277,396
MEANS FOR MODULATING A LASER
Hermann Statz, Wayland, and Roy A. Paananen, Lexington, Mass., assignors to Raytheon Company, Waltham, Mass., a corporation of Delaware
Filed Apr. 23, 1962, Ser. No. 189,458
11 Claims. (Cl. 332—16)

This invention relates to improvements in coherent electromagnetic radiation producing devices and has particular reference to novel means of modulating the output of such devices.

The device embodying the present invention produces electromagnetic radiation in the visible and near visible regions of the spectrum, which radiation inherently has the subtle property of coherence, has a relatively small wavelength spread, and is therefore highly monochromatic. Several types of such devices have been developed for producing coherent electromagnetic radiation, all of which appear to fall into one or the other of two clearly defined classes. One class embodies structure wherein an activating radiation such as a radio frequency discharge is introduced or "pumped" into a gaseous converting or transducing medium, such as a mixture of helium and neon, which absorbs the radiation and responds by emitting its own energy in the form of intense coherent electromagnetic radiation of an extremely small wavelength spread. The other class employs a rod of ruby or other selected crystalline material into which wavelengths of relatively high intensity light are introduced or "pumped." The rod absorbs this light energy and responds by emitting its own energy in the form of intense coherent light of an extremely small wavelength spread.

Modulation of the output radiation from these devices, such as is required in successful communications and other systems, heretofore has been difficult to efficiently achieve. However, in accordance with the present invention, means and methods are described for modulating the output of such devices by the efficient utilization of the Zeeman principle wherein the energy levels of the output radiation are split by a magnetic field to produce two circularly polarized components having different senses or directions of rotation. In accordance with this invention the two rotary polarized components are superposed to produce linearly polarized light where the plane of polarization rotates with half the difference frequency of the two circularly polarized components.

More specifically, in the gaseous type of device, a negative temperature medium such as a mixture of helium and neon is located between reflectors such as or similar to Fabry-Perot mirrors. The medium is pumped with radio frequency energy, and collision processes between helium and neon atoms occur, which causes population inversion between two different energy levels. The transition between energy levels produces electromagnetic radiation which strikes the mirrors. The mirrors reflect most of the radiation falling upon them back into the medium so that self-oscillation occurs. Therefore, an output beam of coherent electromagnetic radiation is emitted at a known frequency.

In accordance with this invention, the device is subjected to a magnetic field to split the output radiation into two or more components in accordance with the known Zeeman effect. The two components, which we found to be rotary polarized, are fed through a plane polarizer or analyzer to produce a single component which is modulated in accordance with the difference in frequencies between the two polarized components entering the analyzer. Modulation of the magnetic field surrounding the device varies the extent of splitting of the energy levels and, therefore, varies the frequency difference between the two polarized components, thereby changing the frequency of the single component. Thus, the finally produced single component frequency will also vary in accordance with the modulation of the magnetic field.

A clear understanding of the invention will become apparent from the following description taken in connection with the accompanying drawings, wherein.

Figure 1:
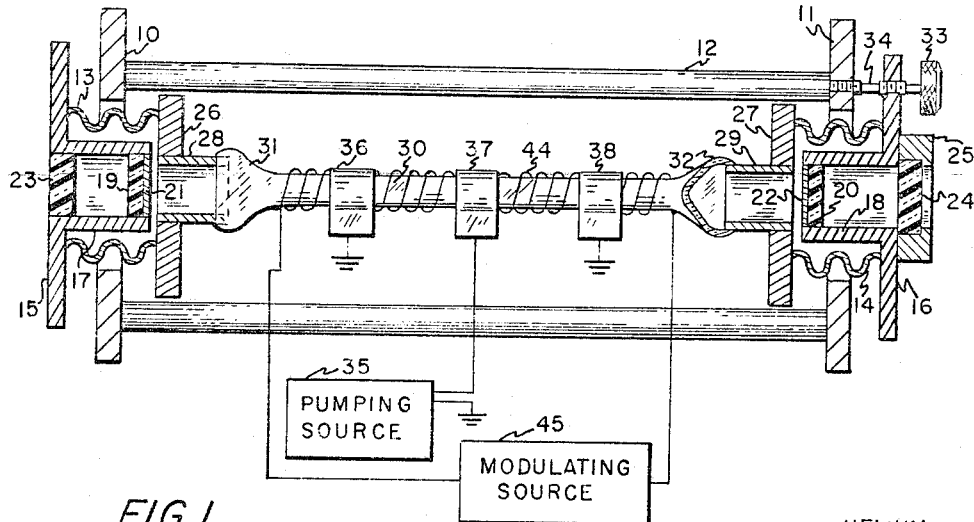
FIG. 1 is a front elevational view partly in vertical axial section of a device embodying the invention.

Referring more particularly to the drawings, the system depicted in FIG. 1, and which illustrates one example of a device employing the invention, embodies novel means for modulating the electromagnetic radiation produced by a coherent radiation producing device employing a gaseous medium as the coherent electromagnetic radiation generator. The term "modulation" as used herein with reference to the output radiation from the device refers to variation in frequency of the output radiation in accordance with variations in a modulating magnetic field applied to the device.

The device includes a frame which embodies a pair of parallel spaced supporting rings 10–11 connected by four substantially equally spaced longitudinally extending rods 12. Extending through the central opening in each ring 10–11 is a respective bellows 13 and 14, each of which has its outer end vacuum sealed to the adjacent surface of a respective window-carrying disc 15 and 16. Each disc 15–16 has an inwardly extending tubular portion 17–18 the inner ends of which each carry a mirror 19 and 20 respectively. The mirrors 19–20 are preferably quartz discs having dielectric reflective coatings 21–22 respectively on their inner surfaces. At the outer ends of the central cavities formed by the tubular portions 17–18 are respective quartz or similar windows 23–24, one or both of which may be demountable as shown by bezel 25.

The opposite end of each bellows 13–14 is sealed to a floating ring 26–27, each of which carries a tubular retainer or sleeve 28–29 respectively. Extending between and supported by the sleeves is a transparent discharge tube 30 which is filled with a gaseous negative temperature medium such as a mixture of helium and neon, or caesium vapor, or other selected gaseous medium, preferably about 0.1 mm. Hg of neon and about 1.0 mm. of helium. The ends of tube 30 may be supported by any suitable means but are shown in FIG. 1 as having slightly enlarged end portions 31–32 enclosing and sealed to the adjacent inner ends of the respective sleeves 28–29. Thus, the interiors of the sleeves and of the bellows 13–14 are included in the gas-filled chamber.

Angular adjustment of disc 16 and, consequently, of mirror 20 may be accomplished by manual operation of one or more devices such as knob 33 on shaft 34 which rotates in ring 11 and threadedly engages disc 16. By this means, areas of the bellows 14 may be contracted and expanded to angle the mirror as desired to select the mode of the device. Both mirrors 20 and 21 may be made adjustable, if desired.

Pumping of the gaseous negative temperature medium is accomplished by a device 35 which produces a suitable selected "radio frequency," which term is intended to include microwave frequencies. The device 35, for example, may be a simple "ham" transmitter which satisfactorily has an output rating of 50–60 watts to produce an RF signal of about 27 megacycles. However, any desired frequencies can be used which may be effectively coupled to the gas medium. Even very low frequencies can be used if direct connection is made through the walls of the tube to the interior; also frequencies as high as and including the frequencies of light. The device, indicated in FIG. 1 by box 35, is preferably connected by three electrodes 36–37–38 wrapped around tube 30. The outer electrodes 36–38 are connected to ground and the center electrode 37 is connected to a matching circuit in the transmitter.

Figure 2:
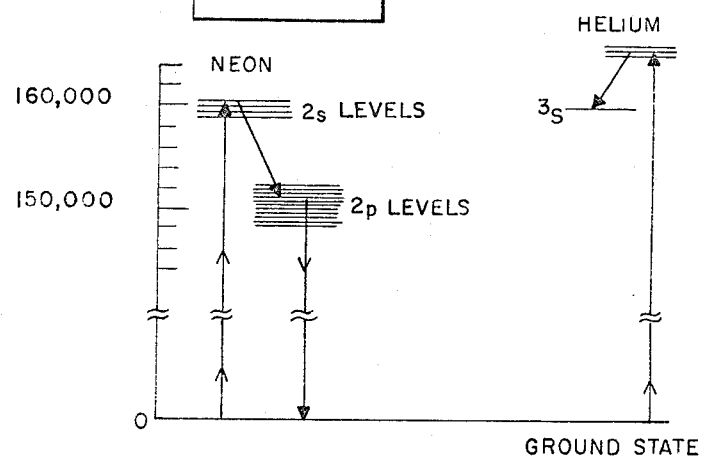
FIG. 2 is an energy level diagram applying to the device embodying the invention.

When the device 35 is operated, the pumping radiation acts upon the negative temperature medium which responds by producing an intense beam of coherent electromagnetic radiation which passes out of the device through windows 23 and 24. To briefly describe the generation of radiation by the device, it is to be understood that the atoms of the gaseous medium are activated or "pumped" by the exciting or activating signal from the device 35; that is, the energy levels of the atoms are "pumped" from a ground state to higher energy levels or bands. By "pumping" is meant that a coherent electromagnetic radiation generating medium is activated by selected radiation which causes the atoms of the medium to be changed from a nonexcited to an excited state whereupon the coherent electromagnetic radiation is produced. Referring to the diagram of FIG. 2, the energy levels of the helium gas component in the negative temperature medium are pumped from the ground state to an upper level and then drop to a band indicated as $3_S$ level, which causes the neon gas component to be pumped from the ground state to a band in the vicinity of 160,000 cm.$^{-1}$, shown as the $2s$ level.

The helium atoms which reach energy levels slightly higher than the $3_S$ levels and then drop to the $3_S$ level will, in the process, emit a relatively faint light which is not intended to contribute to the output radiation. The energy of the neon atoms, however, will drop from the $2s$ levels to the $2p$ levels which are in the vicinity of 150,000 cm.$^{-1}$. During this transition the neon will produce fluorescence in the infra-red spectrum. Thereafter, the neon energy levels will drop back to the ground state and will be repumped in the production of a continuous output beam of infra-red radiation.

Figure 3:
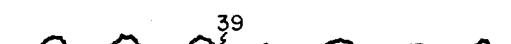
FIG. 3 is a curve illustrating output intensity of the unmodulated device.

We have observed certain features in the output of the device which can be attributed to a Zeeman effect resulting from the earth's magnetic field. In FIG. 3, the output intensity is shown as a function of time under weak RF excitation conditions. The output curve 39 shows a ripple of 120 cycles per second, which is due to some residual amplitude modulation of the 27 mc. excitation used in the particular system described herein.

Figure 4:
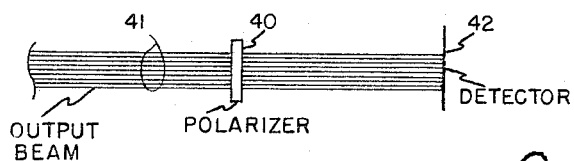
FIG. 4 is a schematic diagram illustrating the position of a polarizer in the system of the invention.
Figure 5:
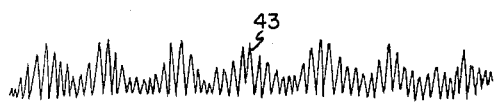
FIG. 5 is a curve illustrating output intensity of the modulated device.

We have found that a polarizer 40 inserted in the path of the output beam 41 (FIG. 4) between the device and a suitable infrared detector 42, such as a phototube or the like, will result in a modulation of the output of about 1050 cycles, as shown by curve 43 in FIG. 5. Further, it was found that rotation of the polarizer has relatively little effect on the output except that the waveform of the modulated signal may change somewhat, thus indicating that the output beam 41 is linearly polarized and that the plane of polarization is rotating at a frequency of about 525 cycles per second.

Figure 6:
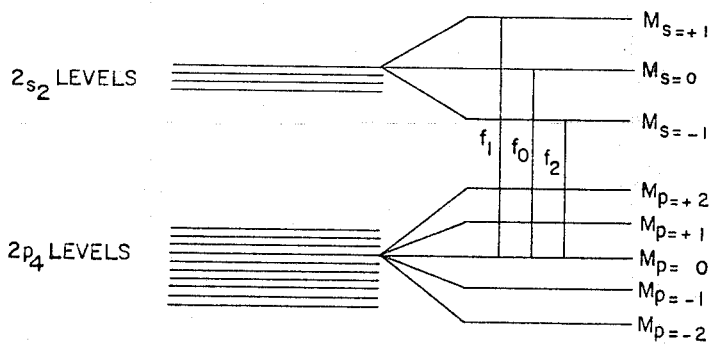
FIG. 6 is a diagram illustrating the Zeeman splitting of energy levels and particularly pointing out the output frequencies utilized in the present invention.

The strongest output of the device is at about 1.1526$\mu$ and corresponds to a transition between the $2a_2$ and $2p_4$ levels of neon. The $2s_2$ and $2p_4$ states have angular moments J of 1 and 2 respectively. In a magnetic field these levels split up into 3 and 5 energy states respectively as shown in FIG. 6. The splitting is described by $$E_i(H) = E_i(O) + g_i B H m_i$$

wherein E stands for the energy of the state, the subscript $i$ refers to $2s_2$ or $2p_4$, H is the magnetic field, $g_i$ is the spectroscopic splitting factor of $i$, B is the Bohr magneton, and $m_i$ is the z-component of the angular momentum. The value of $g$ for the $2p_4$ state is 1.301 and for the $2s_2$ state is substantially the same.

In accordance with this invention, we have provided means for modulating the frequency of the output beam 41. This is done by applying a magnetic field to the gaseous negative temperature medium within the tube 30. To accomplish this, we have wound a coil 44 (FIG. 1) about tube 30, preferably between the tube and electrodes 36–37–38. The coil is connected to a modulating source 45 whereby a modulating electrical signal may be applied to the coil to create a modulating magnetic field around the tube 30. The modulating source 45 may be any suitable signal generating device which creates and transmits an electrical signal which is to be converted and transmitted by the device shown in FIG. 1.

The magnetic field applied to the negative temperature medium as described above causes a splitting of energy levels in the output beam in accordance with the well-known Zeeman effect, the amount or extent of splitting being determined by the size of the magnetic field; the larger the field, the wider the splitting that is achieved. This is illustrated in FIG. 6 wherein it will be seen that the $2s_2$ level splits into three widely spaced levels indicated by $M_s = +1$ and $M_s = -1$ on opposite sides of the $M_s = 0$ level. The $2p_4$ level splits into five levels, the $M_p = 0$ level separating the $M_p = +1$ and $M_p = +2$ levels from the $M_p = -1$ and $M_p = -2$ levels, as shown.

Figure 7:
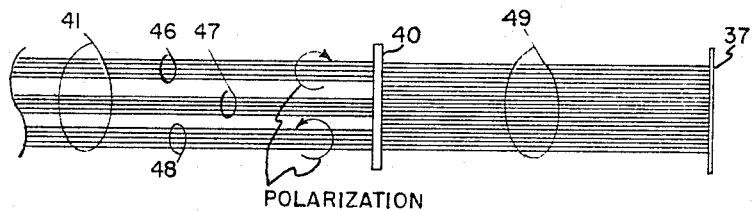
FIG. 7 is a schematic drawing illustrating diagrammatically the output beam and its alteration by a polarizer.

We have found that the output beam 41 (FIG. 4) now contains three components; one of which has an unchanged frequency $f_0$, another of which has a frequency $f_1$ corresponding to the difference between energy levels $M_s = +1$ and $M_p = 0$ and the third has a frequency $f_2$ corresponding to the difference between energy levels $M_s = -1$ and $M_p = 0$. This is diagrammatically illustrated in FIG. 7 where output beam 41 is shown as embodying three components, 46, 47, and 48 which impinge upon polarizer 40.

Component 46 is shifted toward higher frequencies and is right circularly polarized. Component 48 is shifted toward lower frequencies and is left circularly polarized, while component 47 lies on the $2s_2$ line and is linearly polarized. Component 47 has been found, however, to be nonexistent when the magnetic field is substantially parallel to the axis of the tube 30 because the gain may be below the threshold for laser action. Regardless, component 47 does not affect the operation of this device when it does happen to exist because it may be readily eliminated by slight rotation of the polarized analyzer 40.

The two circularly polarized components, which may sometimes be considered as elliptically polarized when viewed along different axes, are superimposed upon the polarizing analyzer 40 and emerge as a linearly polarized beam 49 where the plane of polarization is rotating with half the difference frequency between the two components 46 and 48.

The difference frequency between right- and left-hand polarized light is smaller than the Zeeman shift of the corresponding lines because of the "pulling" effect of the cavity resonance; that is, of the resonance of the tube 30. The device will oscillate at a frequency $\nu_0$ where $$\nu_0 = \nu_c + (\nu_{Ne} - \nu_c) \frac{\Delta \nu_c}{\Delta \nu_{Ne}}$$

In the above equation, $\nu_c$ and $\nu_{Ne}$ are the cavity and neon transition frequencies and $\Delta \nu_c$ and $\Delta \nu_{Ne}$ are their respective half widths. If we assume that in the first above-mentioned equation $g=1.3$ and $H=0.5$ gauss, and assuming that $\Delta \nu_{Ne}=10^3$ mc., and $\Delta \nu_c=0.33$ mc. ($Q \approx 10^9$), then with the above equation we calculate a frequency of 300 cycles/sec. for the rotation of the plane of polarization of beam 49. This assumes that a magnetic field is applied parallel to the axis of tube 30. It is to be understood, however, that the axis of the magnetic field may be located at some angle with respect to the axis of the tube 30, if desired, without seriously affecting the operation of the device.

We have found that the plane of polarization of beam 49 normally changes at a rate of about 625 cycles/sec. gauss. With the values cited above, the rate is about 610 cycles/sec. gauss. This closeness of rates indicates the accuracy of the described system and method of calculation, because of the Q of the Fabry-Perot type resonator is not known to extreme accuracy.

Figure 8:
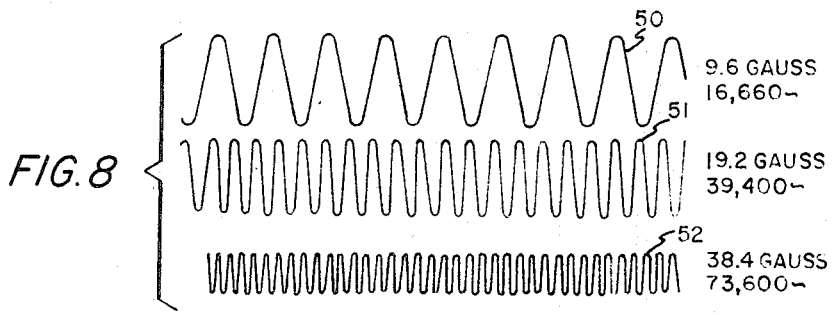
FIG. 8 is a chart showing three different frequency curves produced by the device of the invention.

The chart in FIG. 8 shows three different frequency curves obtained by applying three different magnetic fields to the generating device. Curve 50 shows a frequency of 16660 cycles per second with an applied field of 9.6 gauss, curve 51 shows a frequency of 39400 cycles per second with an applied field of 19.2 gauss, and curve 52 shows a frequency of 73600 cycles per second with an applied field of 38.4 gauss.

Figure 9:
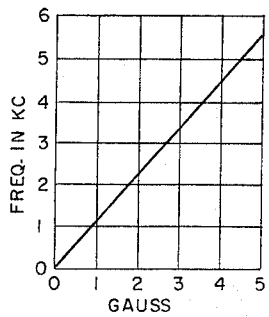
FIG. 9 is a curve illustrating output frequency per unit of modulating magnetic field.

The curve in FIG. 9 shows that the change in frequency as the strength of the magnetic field increases is substantially linear. While the chart in FIG. 9 depicts relatively low frequencies for relatively low strength magnetic fields, it is to be understood that the frequency response is also substantially linear in the case of high frequencies and high strength magnetic fields.

An additional effect is found to exist when the peak in the gain for the two circular polarizations is separated approximately by the frequency difference between two principal modes, which modes refer to an integral number of half wavelengths between mirrors. For the proper spacing of the mirrors and under weak excitation conditions, one circular polarization will oscillate in one mode and the other will oscillate in the next mode, and their frequency separation will be approximately equal to that of the two modes.

From the foregoing, it will be apparent that novel means and method have been accomplished for modulating the output of coherent electromagnetic radiation producing devices. However, it is to be understood that modifications may be made by those skilled in the art without departing from the spirit and scope of the invention as expressed in the accompanying claims. Therefore, all matter shown and described is to be interpreted as illustrative and not in a limiting sense.

What is claimed is:

1. A device for producing a modulated beam of coherent electromagnetic radiation comprising an energy converting device, a source of pumping radiation for the converting device for causing the device to generate a beam of coherent electromagnetic radiation, means for splitting the beam into two components having different frequency characteristics, and means for integrating said components to produce a single beam having modulation corresponding to the difference in frequency characteristics of said two components.

2. A device for producing a modulated beam of coherent electromagnetic radiation comprising an energy converting device, a source of pumping radiation for the converting device for causing the device to generate a beam of coherent electromagnetic radiation, means for spliting the beam into two polarized components having different senses of polarization and different frequencies, and means for superimposing said components to convert said beam to a linearly polarized beam.

3. A device for producing a modulated beam of coherent electromagnetic radiation comprising an energy converting device, a source of pumping radiation for the converting device for causing the device to generate a beam of coherent electromagnetic radiation, means for splitting the beam into two polarized components having different senses of polarization and different frequencies, and a polarized analyzer disposed in the path of said beam for converting said components to a linearly polarized beam wherein the plane of polarization rotates with half the difference frequency of the two components.

4. A device for modulating a beam of coherent electromagnetic radiation comprising an energy converting device, a source of pumping radiation for the converting member and operable to cause the member to generate a beam of coherent electromagnetic radiation, a source of modulating radiation connected with said converting device and operable to split the beam into two polarized components having different frequencies and different senses of rotation, and polarized means in the path of said two components for converting the components to a linearly polarized beam wherein the plane of polarization rotates with half the difference frequency of the two components.

5. A device substantially as set forth in claim 4 wherein said modulating radiation is a varying magnetic field.

6. A device substantially as set forth in claim 4 wherein said pumping radiation is radio frequency.

7. A device substantially as set forth in claim 4 wherein said energy converting device is a negative temperature medium.

8. A device substantially as set forth in claim 5 wherein said negative temperature medium is a gaseous composition.

9. A device substantially as set forth in claim 8 wherein said gaseous composition comprises helium and neon.

10. A device comprising a generator of coherent radiation in the infrared region of the electromagnetic spectrum, said generator comprising a chamber having end reflective members and transparent sides, a negative temperature medium disposed within the chamber, means arranged around the chamber for pumping said medium to produce an output beam of said radiation, a modulating source of radiation disposed to direct a modulating magnetic field upon said generator to split an output beam therefrom into two polarized components having a difference in frequency corresponding to the size of the magnetic field and having different senses of rotation, and means in the path of said components for converting the components to a linearly polarized beam wherein the plane of polarization rotates with half the difference frequency of the two components.

11. A device substantially set forth in claim 1 wherein said last-named means is a polarizing analyzer.

References Cited by the Examiner

UNITED STATES PATENTS

| | | | |
|---|---|---|---|
| 2,929,922 | 3/1960 | Schawlow et al. | |
| 3,059,117 | 10/1962 | Boyle et al. | 250—199 |
| 3,098,112 | 7/1963 | Horton | 88—1 |

OTHER REFERENCES

Javan et al.: Physical Review Letters, Feb. 1, 1961, vol. 6, No. 3, pages 106–110.

Oliver: Proceedings of the IRE, February 1962, pages 135–141.

ROY LAKE, *Primary Examiner.*

N. KAUFMAN, A. BRODY, *Assistant Examiners.*